United States Patent [19]
McNaney

[11] 4,098,548
[45] * Jul. 4, 1978

[54] LIGHT OPTIC DATA HANDLING SYSTEM

[76] Inventor: Joseph T. McNaney, 8548 Boulder Dr., La Mesa, Calif. 92041

[ * ] Notice: The portion of the term of this patent subsequent to Oct. 12, 1993, has been disclaimed.

[21] Appl. No.: 729,310

[22] Filed: Oct. 4, 1976

[51] Int. Cl.$^2$ .............................. G02F 1/16
[52] U.S. Cl. ................................. 350/359
[58] Field of Search ............ 350/160, 161; 332/7.51; 340/173 R, 173 LM, 173 LS, 173 LT

[56] References Cited
U.S. PATENT DOCUMENTS

| | | | |
|---|---|---|---|
| 3,872,451 | 3/1975 | McNaney | 340/173 LM |
| 3,960,440 | 6/1976 | McNaney | 350/161 W |
| 3,985,426 | 10/1976 | McNaney | 350/160 R |
| 3,985,428 | 10/1976 | McNaney | 350/160 R |

*Primary Examiner*—William L. Sikes

[57] ABSTRACT

Light optic data handling system herein includes optical switch means adaptable to miniaturized thin film and integrated optic requirements in lightwave communications.

2 Claims, 6 Drawing Figures

LIGHT OPTIC DATA HANDLING SYSTEM

BACKGROUND OF THE INVENTION

The invention herein relates to certain teachings set forth in the embodiments of the applicant's U.S. patent application Ser. No. 655,152. Various embodiments of the present invention are directed toward means of greatly increasing the light reflection control sensitivity of the device within the system of light reflecting surfaces thereof utilizing either the interdigital electrode or acoustooptic means associated with the light reflection control system of the device.

SUMMARY OF THE INVENTION

A beam of light, which can be in the form of radiant energy extending from ultraviolet, through the visible spectrum, to infrared, and preferably from a laser source, is directed along an input path toward a light admitting surface of the system of light reflecting surfaces. Upon entering the system light is directed, first, along a primary optical path and then, controllably, along a secondary path therein. The means for directing the light along these paths include an array of light reflecting surfaces, each angularly oriented so as to establish an optical relationship one with respect to the other for allowing the light to follow these paths forming a helix of plural revolutions. The array of surfaces provide a reflection control position where the primary path ends and the secondary path begins. Light reflection control means is operatively associated with this position for effecting the redirecting of light away from the primary path to, and along, the secondary path. This secondary path extends beyond the light reflecting limits of the array upon reaching a predetermined light output surface of the array. The optical path length of the secondary path between the light reflection control position and the output surface is designed to provide a magnification of the light redirecting capabilities of the light reflection control means; a manifestation of the magnification appearing at the output surface of the system. Different embodiments of the invention illustrated herein show, by way of example only, the means of meeting this light redirecting sensitivity magnification requirement and objective of the invention. The description which follows when read in connection with the drawings will provide a better understanding of the objective as well as other advantages of the invention.

DESCRIPTION OF THE INVENTION

Figure 1:
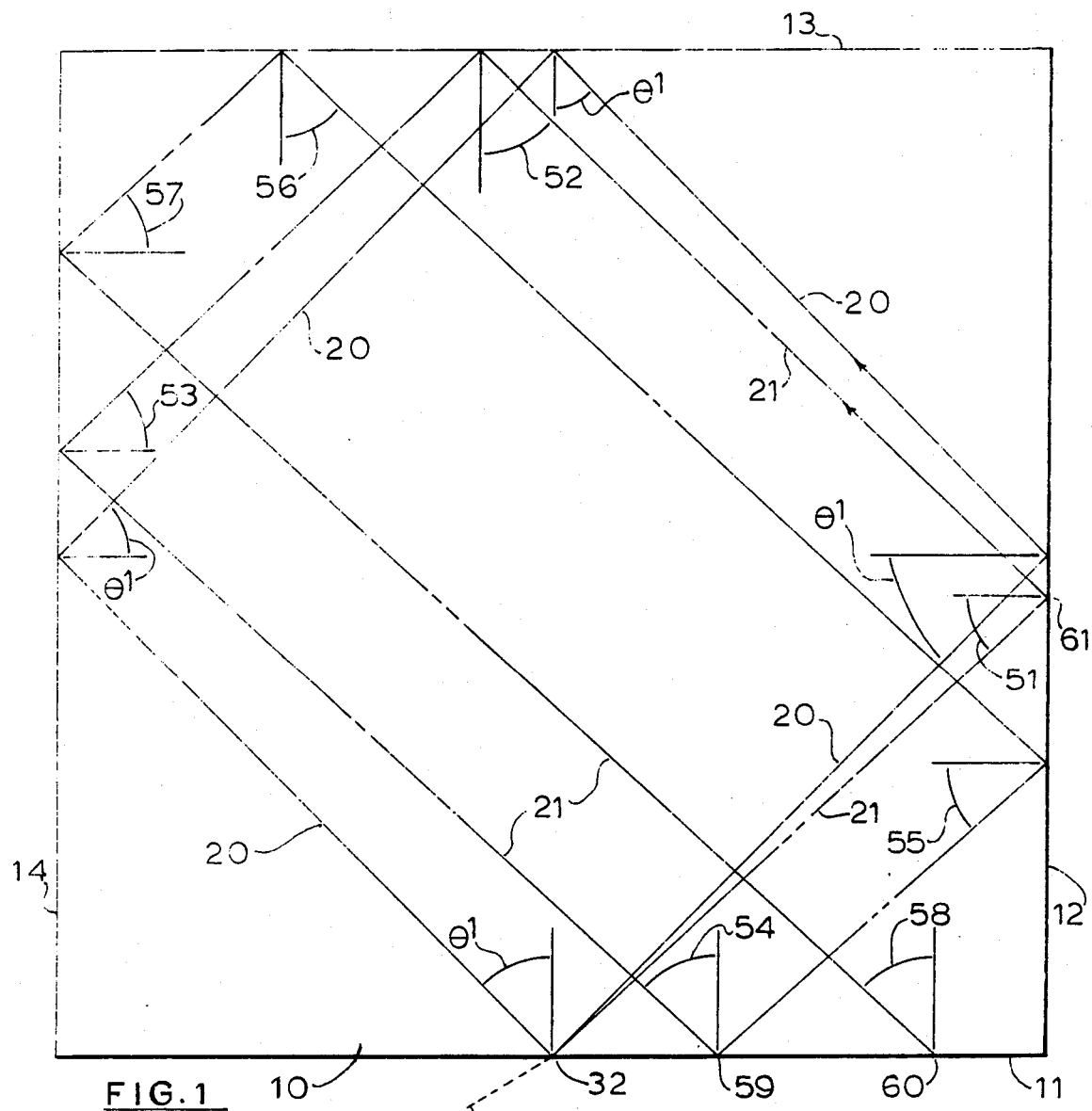
FIG. 1 represents a greatly enlarged illustration showing an end view of the principal light conductor of the invention setting forth the operating principles thereof.

Referring now to FIG. 1, the illustration will be referred to as the end view of a light conducting member 10, exemplified as presenting four light reflecting surfaces 11, 12, 13 and 14, each considered as being a light reflecting interface of the member 10 material and, for example, the air environment surrounding it. The drawing of this member 10, as well as similar portions of each of the other embodiments herein, is shown 10 to 100 times normal size for the purpose of aiding in the descriptions thereof. The exact nature of the material of member 10 will be dependent on particular application requirements of the invention. Therefore, it may be necessary to select the material of member 10 from any, or combinations, of a wide variety of light conducting materials. The selection may include glass or plastic materials, or perhaps tourmaline, quartz, barium titanate, lithium niobate, to name a few, or still other materials, gas, liquid or solid, exhibiting either piezoelectric, Kerr, Pockels or ferroelectric effects.

Figure 2:
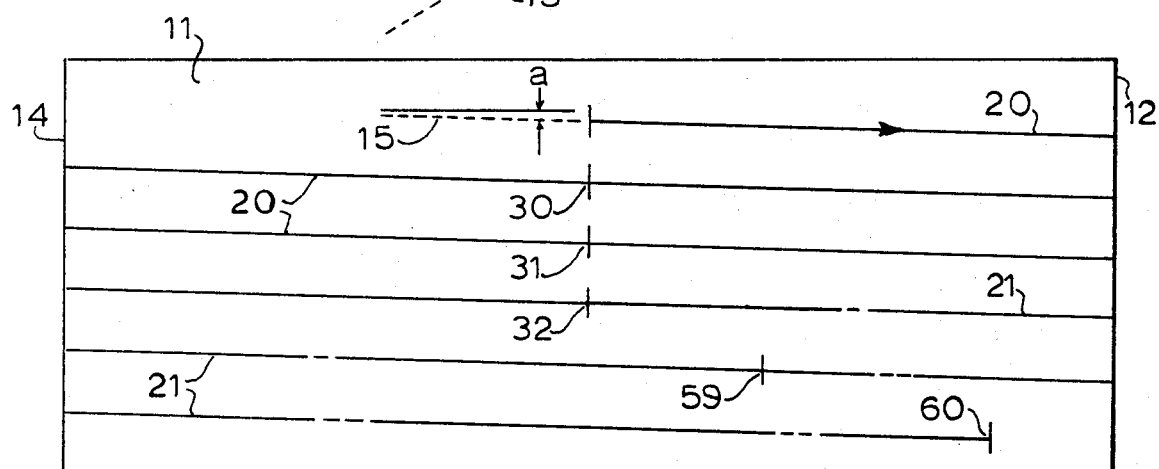
FIG. 2 is a side view of the initial illustration.

Referring to FIGS. 1 and 2, light, preferably from a laser source, will be described as being directed along a refraction-compensated input path 15, in FIG. 1, toward the surface 11, and at a predetermined angle $a$ toward the surface 11 as indicated in FIG. 2, the latter being a side view of the member 10. Light, upon entering the member 10, will follow a primary path 20. Light incident upon the surface 12 at the angle $\theta^1$ is reflected toward and incident upon surface 13 at a similar angle $\theta^1$, then reflected toward and incident upon surface 14 at a similar angle $\theta^1$, then reflected toward and incident upon surface 11 at a similar angle $\theta^1$, then reflected toward and incident upon the surface 12 at a similar angle $\theta^1$, and so on. As shown in FIG. 2, because of the entry angle $a$ the path 20 will form a helix of plural revolutions through the length dimension of the member 10, and light incident upon the surface 11 at angle $\theta^1$ will occur at a series of light reflecting positions 30, 31, 32, and continue, of course, unless the light is directed away from the primary path 20.

Figure 3:
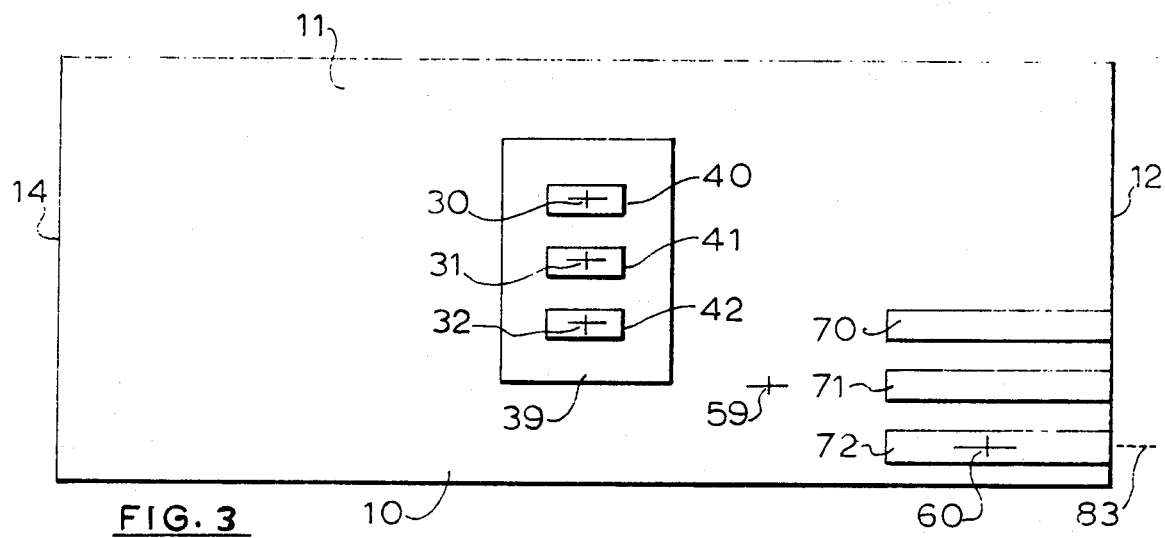
FIG. 3 relates to the illustrations of FIGS. 1 and 2 showing the required positions of a plurality of light reflection control means and a series of output light conductors which are supported and intimately joined to the output surface of the device.
Figure 4:
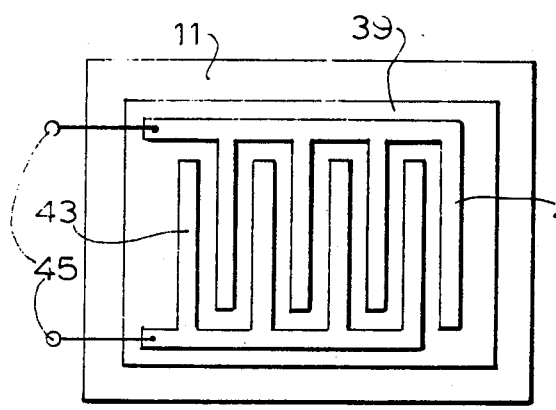
FIG. 4 is a greatly enlarged representation of an electrode assembly which may be utilized in combination with the light reflection control means of the first embodiment of the invention.

In FIG. 3 the series of positions 30, 31 and 32 are again shown. Coincident with each of these positions there is a series of light reflection control means indicated, respectively, as blocks 40, 41 and 42. Each block is representative of an interdigital electrode assembly somewhat as illustrated in FIG. 4, having at least first and second electrodes 43 and 44 and input terminals 45 for applying an electrical signal thereto. Intermediate the electrode assemblies and the member 10 there is a film of light conducting material 39 of a thickness of the order of the wavelength of the light along the path 20 deposited on the polished surface of the member 10. The electrodes 43 and 44 are intimately joined to the film 39. Film 39 materials will be selected from a wide variety of materials but in each case having an index of refraction lower than that of the member 10 material and electrooptically compatable with the latter. For example, the film 39 may be of glass in combination with a member 10 of lithium niobate or crystal quartz, or, the film 39 may be of lithium niobate or lithium tantalate and the member 10 of glass.

In operation, an electrical potential will be applied, selectively, to one of the electrode assemblies 40, 41 or 42 for the purpose of redirecting light away from the primary path coincident with a corresponding one of the light reflecting positions 30, 31 or 32, and thereupon along a secondary path within the array of reflecting surfaces 11, 12, 13 and 14 and toward, what will be referred to as, an output surface of the member 10. In response to an induced diffraction grating coincident with a light reflecting interface of member 10 and film 39 materials, position 32 for example as indicated in FIGS. 1 and 2, light will be allowed to follow a path 21 until reaching the point 61 of surface 12 of member 10. This redirecting of light from position 32 will allow light incident upon surface 12 at an angle 51, at least smaller than the primary path angle $\theta^1$, to be reflected therefrom so as to be incident upon surface 13 at an angle 52, then reflected toward and incident upon surface 14 at an angle 53, then reflected toward and incident upon surface 11 at an angle 54, then reflected toward and incident upon surface 12 at an angle 55, then reflected toward and incident upon surface 13 at an angle 56, then reflected toward and incident upon surface 14 at an angle 57, and finally reflected toward and incident upon surface 11 at an angle 58. In the above manner light will have returned to surface 11 at a first point 59 and then again at a second point 60. These points are again identified in FIGS. 2 and 3, and the distance of each point from the point 32 is directly related to the angular difference between the angle $\theta^1$ and angle 51 of light incident upon the surface 12. The distance between point 32 and point 60 manifests a magnification of this angular difference. For example, magnifications of greatly smaller angular differences can be accomplished and exhibited in making the light available in the area of point 60 by corresponding increases in the number of revolutions of the light along the secondary path 21.

Means of utilizing light available at the point 60 may include, for example, the use of a light conducting material illustrated as comprising a film 72 of such material having an index of refraction higher than that of the member 10 material. Light at the interface thereof will be admitted to the film and thereupon directed along a path 83. The interface about point 60 represents an output surface of the system. This output surface is related to the light reflection control means 42. Output surfaces of films 70 and 71 are related, respectively, to control means 40 and 41.

Figure 5:
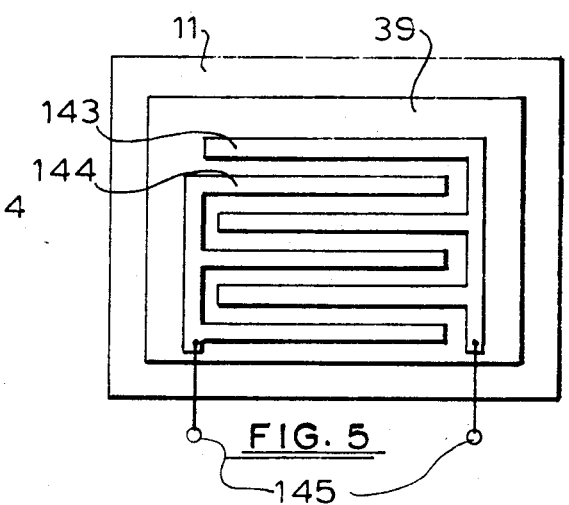
FIG. 5, also greatly enlarged, represents an electrode assembly which may be utilized in combination with the light reflection control means of a second embodiment of the invention.
Figure 6:
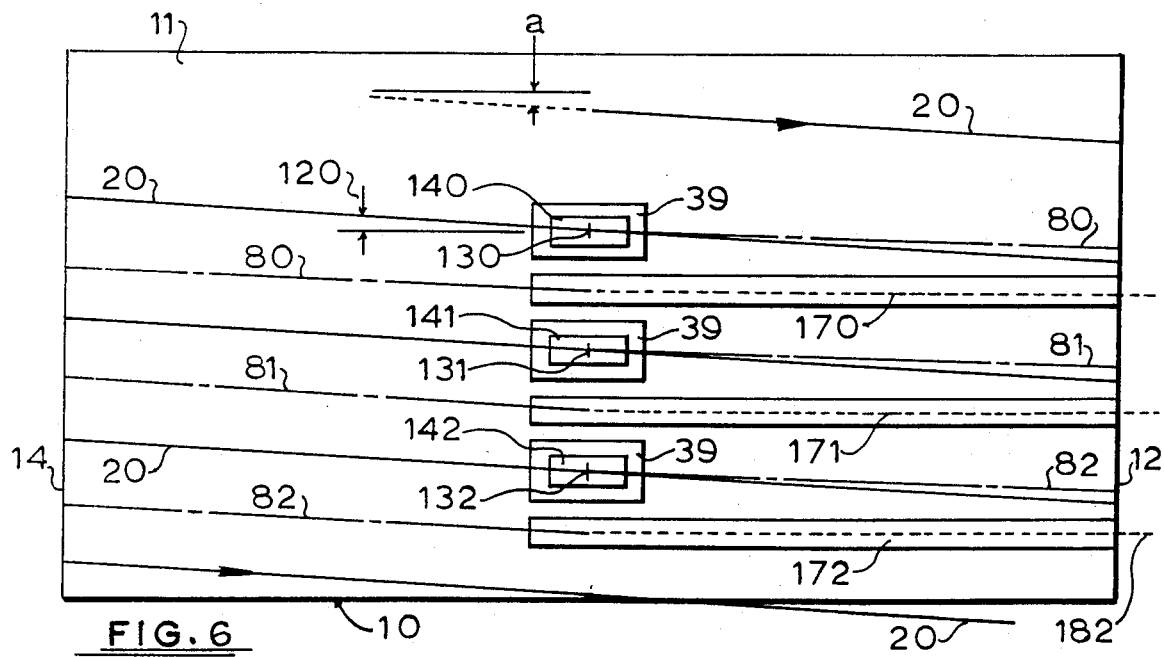
FIG. 6 will be referred to in a description of the second embodiment of the invention.

A further embodiment of the invention can be described by also referring to FIGS. 5 and 6. Elements and materials are somewhat like those being referred to in the initial embodiment but arranged differently to provide different results. Again the system shows but three light reflection control means 140, 141 and 142, each including an electrode assembly somewhat as illustrated in FIG. 5, having at least first and second electrodes 143 and 144 which have been rotated in relation to those shown in FIG. 4. Light enters the member 10 at a predetermined angle $a$ through the surface 11 and thereupon follows a primary optical path 20 (indicated by the solid line) through the length of the member 10. Adjacent to and immediately following each of the control means 140, etc., there is a film of light conducting material 170, etc. Each of the control means is positioned at a reflection point 130, 131 and 132 of the surface 11 somewhat similar to the positioning of the control means at reflection points 30, 31 and 32 of the FIG. 1 embodiment. However, the electrode elements 143 and 144 are positioned so as to present a grazing angle 120 in relation to the light incident upon each of the points 130, etc., along the primary path 20. Upon the application of an electrical potential to terminals 145 of a given one of the electrode assemblies the induced refractive index change, in accordance with a predetermined grazing angle 120, diffracts light sideways in the direction away from a primary path 20. In response to an input potential the control means 140 effects a redirecting of light along a secondary path 80 and to an output surface adjacent film 170; control means 141 effects a redirecting of light along a secondary path 81 and to an output surface adjacent film 171; and control means 142 effects a redirecting of light along a secondary path 82 and to an output surface adjacent film 172. Light along each of these secondary paths will be incident upon the reflecting surface 12 at an angle which is smaller than the angle of incidence provided by the primary path 20, and therefore responsible for having light reach a given one of the output surfaces and film light conductors.

Each light conducting film is shown as being adjacent to a light reflection control means to which it is optically related and it can be stated that they are separated by one revolution of a secondary path. This one revolution and the dimensioning of the various elements and their placement on the surface 11 is directly related to the angular difference between light incident upon the surface 12 from along the primary path and a secondary path. And this angular difference is a function of the light redirecting sensitivity of the light reflection control means. It should of course be understood that all dimensions of the various elements are exaggerated illustrations and that numerous other arrangements are possible whereby, for example, a number of revolutions can be utilized in combination with still smaller angular differences which would exhibit a greater amplification of such differences at a given output interface of the member 10 material and a thin film light conductor. Also, the invention lends itself to optical switch applications whereby a number of revolutions stemming from the one light reflection control means at correspondingly different angles in relation to an initial primary path will allow light to be directed, selectively, to any of a number of individual thin film light conductors adjacent an output surface of the device. It will also be understood that the invention is not limited to the use of but four light reflecting surfaces of the member 10 since such number could be influenced by materials selected to satisfy a given application. And use of the invention in integrated optics, for example, will involve the including of the member 10 in the substrate or common support of an assembly of related elements.

Acousto-optic means as illustrated and described in the aforesaid application Ser. No. 655,152 can be used in place of the electrode structures of FIGS. 5 or 6 herein for establishing spatial modulation of the refractive index of materials coincident with the normally light reflecting interface at the surface 11.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims.

I claim:

1. A light optic data handling system comprising:

(a) a light input surface, a light output surface and an array of light reflecting surfaces intermediate said input and output surfaces;

(b) a source of light and means for directing light therefrom along an input path toward said input surface and thereupon along an optical path while undergoing a series of light reflections within said array of light reflecting surfaces so as to establish an availability of light from said source coincident with at least one predetermined location along said optical path for an optically controlled redirecting of said light at said location and a reflecting of said light within said array of reflecting surfaces toward said output surface, said location representative of a light output control position of said system;

(c) said array of light reflecting surfaces each angularly oriented so as to establish an optical relationship between said input surface and said control position and between said control position and said output surface, said optical relationship of said array allowing said light to follow said optical path forming a helix of plural revolutions extending from said input surface to said output surface of the array of light reflecting surfaces;

(d) light reflection control means operatively associated with said control position for establishing a light diffraction grating in the path of said light for thereby effecting said controlled redirecting of the light at said location and said reflecting of the light toward said output surface.

2. A light optic data handling system comprising:

(a) a light input surface, a plurality of output surfaces and an array of light reflecting surfaces intermediate said input surface and said output surfaces;

(b) a source of light and means for directing light therefrom along an input path toward said input surface and thereupon along an optical path while undergoing a series of light reflections within said array of light reflecting surfaces so as to establish an availability of light from said source coincident with each of a plurality of predetermined locations along said optical path for an optically controlled redirecting of said light, selectively, at any one of said locations and a reflecting of said light within said array of reflecting surfaces toward a corresponding one of said plurality of output surfaces, each of said locations representative of a light output control position of said system;

(c) said array of light reflecting surfaces each angularly oriented so as to establish an optical relationship between said input surface and each of said plurality of control positions and between each of said control positions and a corresponding one of said output surfaces, said optical relationship of said array allowing said light to follow said optical path forming a helix of plural revolutions extending from said input surface to the output surfaces of said array of light reflecting surfaces;

(d) light reflection control means operatively associated with each of said control positions for establishing, selectively, a light diffraction grating in the path of said light thereat for effecting said controlled redirecting of the light at said location and said reflecting of the light toward said output surface corresponding thereto.

* * * * *